(12) United States Patent
Jung et al.

(10) Patent No.: US 10,824,341 B2
(45) Date of Patent: Nov. 3, 2020

(54) FLASH-BASED ACCELERATOR AND COMPUTING DEVICE INCLUDING THE SAME

(71) Applicants: MemRay Corporation, Seoul (KR); YONSEI UNIVERSITY, UNIVERSITY-INDUSTRY FOUNDATION (UIF), Seoul (KR)

(72) Inventors: Myoungsoo Jung, Incheon (KR); Jie Zhang, Incheon (KR)

(73) Assignees: MemRay Corporation, Seoul (KR); Yonsei University, University-Industry Foundation (UIF), Seoul (KR)

( * ) Notice: Subject to any disclaimer, the term of this patent is extended or adjusted under 35 U.S.C. 154(b) by 0 days.

(21) Appl. No.: 15/184,179

(22) Filed: Jun. 16, 2016

(65) Prior Publication Data

US 2017/0285968 A1    Oct. 5, 2017

(30) Foreign Application Priority Data

Apr. 4, 2016    (KR) .................. 10-2016-0041120

(51) Int. Cl.
*G06F 12/00*     (2006.01)
*G06F 3/06*      (2006.01)
(Continued)

(52) U.S. Cl.
CPC ............ *G06F 3/0611* (2013.01); *G06F 3/061* (2013.01); *G06F 3/0604* (2013.01); *G06F 3/067* (2013.01); *G06F 3/0656* (2013.01); *G06F 3/0679* (2013.01); *G06F 12/0246* (2013.01); *G06F 12/1009* (2013.01); *G06F 13/16* (2013.01); *G06F 2212/1024* (2013.01); *G06F 2212/7201* (2013.01); *G06F 2212/7203* (2013.01)

(58) Field of Classification Search
None
See application file for complete search history.

(56) References Cited

U.S. PATENT DOCUMENTS 5,471,617 A * 11/1995 Farrand ............... G06F 11/0748
709/223
5,559,970 A    9/1996 Sharma
(Continued)

FOREIGN PATENT DOCUMENTS

KR     10-0806343     2/2008

OTHER PUBLICATIONS

Product Manual, "Intel® Xeon® Processor E5-2620 v3, (15M Cache, 2.40 GHz)", Intel, http://ark.intel.com/products/83352/Intel-Xeon-Processor-E5-2620-v3-15M-Cache-2-40-GHz.
(Continued)

*Primary Examiner* — Prasith Thammavong
(74) *Attorney, Agent, or Firm* — Dinsmore & Shohl LLP

(57) ABSTRACT

In a flash-based accelerator, a flash-based non-volatile memory stores data in pages, and a buffer subsystem stores data in words or bytes. An accelerator controller manages data movement between the flash-based non-volatile memory and the buffer subsystem. A plurality of processors processes data stored in the buffer subsystem.
A network integrates the flash-based non-volatile memory, the buffer subsystem, the accelerator controller, and the plurality of processors.

20 Claims, 16 Drawing Sheets

US 10,824,341 B2

Page 2

(51) Int. Cl.
G06F 13/16 (2006.01)
G06F 12/02 (2006.01)
G06F 12/1009 (2016.01)

(56) References Cited

U.S. PATENT DOCUMENTS

| | | | | |
|---|---|---|---|---|
| 6,141,713 A | | 10/2000 | Kang | |
| 6,272,584 B1* | | 8/2001 | Stancil | G06F 13/362 710/10 |
| 6,741,257 B1* | | 5/2004 | Retika | G06F 3/14 345/558 |
| 7,133,857 B1* | | 11/2006 | Zhang | G06F 17/30914 707/917 |
| 7,779,207 B2* | | 8/2010 | Pudipeddi | G06F 3/061 711/135 |
| 8,898,417 B1 | | 11/2014 | Post et al. | |
| 9,767,261 B2* | | 9/2017 | Bakke | G06F 21/30 |
| 10,133,488 B2* | | 11/2018 | Nagaraj | G06F 3/0659 |
| 10,185,499 B1* | | 1/2019 | Wang | G06F 13/00 |
| 2001/0040581 A1* | | 11/2001 | Reddy | G06T 1/60 345/541 |
| 2004/0049642 A1* | | 3/2004 | Liang | G06F 9/3802 711/137 |
| 2007/0220309 A1 | | 9/2007 | Andre et al. | |
| 2008/0016287 A1* | | 1/2008 | Hepler | H04L 1/0043 711/147 |
| 2008/0098195 A1 | | 4/2008 | Cheon et al. | |
| 2008/0263267 A1* | | 10/2008 | Sutardja | G06F 12/00 711/104 |
| 2009/0307416 A1* | | 12/2009 | Luo | G06F 12/0246 711/103 |
| 2009/0310408 A1* | | 12/2009 | Lee | G11C 11/5628 365/185.03 |
| 2010/0082816 A1 | | 4/2010 | Kharat et al. | |
| 2010/0083283 A1 | | 4/2010 | Kharat et al. | |
| 2011/0072192 A1* | | 3/2011 | Sartore | G06F 12/0868 711/103 |
| 2011/0161620 A1* | | 6/2011 | Kaminski | G06F 12/1009 711/207 |
| 2011/0307647 A1* | | 12/2011 | Stalzer | G06F 12/0866 711/103 |
| 2012/0005556 A1* | | 1/2012 | Chang | G06F 12/1009 714/758 |
| 2012/0084532 A1* | | 4/2012 | MaCkenna et al. | G06F 12/0862 712/41 |
| 2012/0239904 A1* | | 9/2012 | Ekanadham | G06F 9/30043 711/207 |
| 2012/0250687 A1* | | 10/2012 | Cao | H04L 45/02 370/392 |
| 2013/0241941 A1* | | 9/2013 | Donaldson | G06F 9/44589 345/505 |
| 2013/0318323 A1* | | 11/2013 | Weissmann | G06F 12/1027 711/207 |
| 2014/0281228 A1* | | 9/2014 | O'Broin | G06F 3/061 711/118 |
| 2014/0325098 A1* | | 10/2014 | Boyd | G06F 3/0683 710/54 |
| 2015/0363327 A1* | | 12/2015 | Chaitanya | G06F 3/0679 711/103 |
| 2016/0048344 A1* | | 2/2016 | Joshi | G06F 11/3419 711/103 |
| 2016/0070701 A1 | | 3/2016 | Lim et al. | |
| 2016/0253093 A1* | | 9/2016 | Zhang | G06F 9/4413 710/308 |
| 2016/0335064 A1* | | 11/2016 | Che | G06F 8/447 |
| 2016/0342509 A1* | | 11/2016 | Kotte | G06F 12/0246 |
| 2017/0116132 A1* | | 4/2017 | Mealey | G06F 12/1009 |
| 2017/0123684 A1* | | 5/2017 | Albot | G06F 3/0611 |
| 2017/0123690 A1* | | 5/2017 | Albot | G06F 3/0617 |
| 2017/0123999 A1* | | 5/2017 | Aslot | G06F 12/126 |
| 2017/0168736 A1* | | 6/2017 | Batra | G06F 9/45558 |
| 2017/0308320 A1* | | 10/2017 | Sharma | G06F 3/0608 |
| 2018/0074843 A1* | | 3/2018 | Smith | G06F 9/45558 |

OTHER PUBLICATIONS

Larry Seiler et al., "Larrabee: A Many-Core x86 Architecture for Visual Computing", ACM Transactions on Graphics, vol. 27, No. 3, Article 18, Aug. 2008.
"Multicore Fixed and Floating-Point Digital Signal Processor; Check for Evaluation Modules (EVM): TMS320C6678", Texas Instruments, Nov. 2010(Revised in Mar. 2014), www.ti.com/lit/gpn/tms320c6678.
Myoungsoo Jung et al., "NANDFlashSim: Intrinsic Latency Variation Aware NAND Flash Memory System Modeling and Simulation at Microarchitecture Level", IEEE, Published in 012 IEEE 28th Symposium on Mass Storage Systems and Technologies (MSST), Apr. 2012.
Rajeev Balasubramanian et al., "Near-Data Processing: Insights From a Micro-46 Workshop", IEEE Computer Society, vol. 34 , Issue: 4, Jul.-Aug. 2014.
"PolyBench/C; the Polyhedral Benchmark suite", PolyBench/C—Homepage of Louis-Noël Pouchet, May 14, 2015: Public release of PolyBench/C 4.1 http://web.cse.ohio-state.edu/~pouchet/software/polybench/.
Jaeyoung Do et al., "Query Processing on Smart SSDs: Opportunities and Challenges", ACM, pp. 1221-1230, Jun. 22, 2013.
Ali Ali et al., "RASSD: A Dynamically Reconfigurable Active Storage Device for Energy Efficient Data Analytics", IEEE, Published in: 2013 4th Annual International Conference on Energy Aware Computing Systems and Applications (ICEAC), pp. 81-86, Dec. 2013.
Manish Arora et al., "Redefining the Role of the CPU in the Era of CPU-GPU Integration", IEEE Micro, vol. 32, Issue 6, pp. 4-16, Aug. 2012.
"Serial ATA: High Speed Serialized AT Attachment", Serial ATA Workgroup(APT Technologies, Inc. et al.), Jan. 7, 2003.
Jian Ouyang et al., "SDF: Software-Defined Rash for Web-Scale Internet Storage Systems", ACM, ASPLOS '14, pp. 471-484, Feb. 24, 2014.
Monica Lam, "Software Pipelining: An Effective Scheduling Technique for VLIW Machines", ACM, vol. 23 Issue 7, Jun. 1, 1988, pp. 318-328.
Myoungsoo Jung et al., "Sprinkler: Maximizing Resource Utilization in Many-Chip Solid State Disks", IEEE(2014 IEEE 20th International Symposium on High Performance Computer Architecture (HPCA)), Feb. 2014.
Joseph A. Fisher, "The VLIW Machine: A Multiprocessor for Compiling Scientific Code", IEEE, vol. 17 , Issue: 7, Jul. 1984, pp. 45-53.
Myoungsoo Jung et al., "Triple-A: A Non-SSD Based Autonomic All-Flash Array for High Performance Storage Systems", ACM,(ASPLOS '14 Proceedings of the 19th international conference on Architectural support for programming languages and operating systems), Feb. 24, 2014, pp. 441-454.
White Paper, "Flash Fabric Architecture", Violin Memory, Inc., Mar. 2016, www.violin-memory.com.
Sudharsan Seshadri et al., "Willow: A User-Programmable SSD", ACM(OSDI'14 Proceedings of the 11th USENIX conference on Operating Systems Design and Implementation), Oct. 6, 2014, pp. 67-80.
Benjamin Y. Cho et al., "XSD: Accelerating MapReduce by Harnessing the GPU inside an SSD", 46th IEEE/ACM International Symposium on Microarchitecture (MICRO-46), Dec. 8, 2013.
NAND Flash Memory Data Sheet(2Gb: x8, x16 NAND Flash Memory Features), Micron Technology, Inc., Revised History Sep. 2010 www.micron.com/productsupport.
Noor Abbani et al., "A Distributed Reconfigurable Active SSD Platform for Data Intensive Applications", IEEE(High Performance Computing and Communications (HPCC), 2011 IEEE 13th international Conference) , Sep. 2011, pp. 25-34.

(56) References Cited

OTHER PUBLICATIONS

Christian Bernard and Fabien Clermidy, "A Low-Power VLIW processor for 3GPP-LTE Complex Numbers Processing", IEEE, Mar. 2011, pp. 1-6.
Sangyeun Cho et al., "Active Disk Meets Flash: A Case for Intelligent SSDs", ACM, pp. 91-102, Jun. 10, 2013.
Anurag Acharya et al., "Active Disks: Programming Model, Algorithms and Evaluation", ACM, pp. 81-91, Oct. 1998.
Erik Riedel et al., "Active Storage for Large-Scale Data Mining and Multimedia Applications", School of Computer Science Carnegie Mellon University, Feb. 1998.
Sang-Woo Jun et al., "BlueDBM: An Appliance for Big Data Analytics", ACM, Jun. 13, 2015, pp. 1-13.
Danyu Zhu et al., "Building High Performance Storage for Hyper-V Cluster on Scale-Out File Servers using Violin Windows Flash Arrays", Microsoft White Paper, Oct. 2014.
John R. Ellis, "Bulldog: A Compiler for VLIW Architectures", Yale University New Haven, Feb. 1985.
Chingren Lee et al., "Compiler Optimization on Instruction Scheduling for Low Power", IEEE Computer Society, Sep. 20, 2000, pp. 55-60.
Svetlin A. Manavski, "Cuda Compatible GPU as an Efficient Hardware Accelerator for AES Cryptography", IEEE, Nov. 2007, pp. 65-68.
DDR3 SDRAM, Wikipedia, https://en.wikipedia.org/wiki/DDR3_SDRAM.
Yangwook Kang et al., "Enabling Cost-effective Data Processing with Smart SSD", IEEE, May 2013, pp. 1-12.
I. Stephen Choi et al., "Energy Efficient Scale-In Clusters with In-Storage Processing for Big-Data Analytics", ACM, Oct. 5, 2015, pp. 265-273.
Portable Formats Specification, Version 1.1, Tool Interface Standards (TIS), Executable and Linkable Format (ELF), Yale FLINT Group, http://flint.cs.yale.edu/cs422/doc/ELF_Format.pdf.
Product Specificaiton, GeForce GT 610, NVIDIA Corporation, http://www.geforce.com/hardware/desktop-gpus/geforce-gt-610/specifications.
Abdulrahman Kaitoua et al., "Hadoop Extensions for Distributed Computing on Reconfigurable Active SSD Clusters", ACM, vol. 11 Issue 2, Article No. 2, Jun. 2014.
Naga K. Govindaraju et al., "High Performance Discrete Fourier Transforms on Graphics Processors", IEEE Press Piscataway, Article No. 2, Nov. 15, 2008.
Product Specifications, Intel® SSD 750 Series: Performance Unleashed, Intel, http://www.intel.com/content/www/us/en/solid-state-drives/solid-state-drives-750-series.html.
Ravi Budruk et al., "PCI Express System Architecture", MindShare, Sep. 14, 2003(Published date of the 1st edition).

* cited by examiner

FLASH-BASED ACCELERATOR AND COMPUTING DEVICE INCLUDING THE SAME

CROSS-REFERENCE TO RELATED APPLICATION

This application claims priority to and the benefit of Korean Patent Application No. 10-2016-0041120 filed in the Korean Intellectual Property Office on Apr. 4, 2016, the entire contents of which are incorporated herein by reference.

BACKGROUND

(a) Field

The described technology relates to a flash-based accelerator and a computing device including the same.

(b) Description of the Related Art

Manycore-based accelerators such as graphic processing units (GPUs) and many integrated core (MIC) devices with high computation parallelism and comparatively low power consumption are becoming increasingly popular. In such the accelerators, many processing cores share execution control and can perform identical operations on numerous pieces of data via thread-level parallelism and data-level parallelism. A system using the accelerator together with a central processing unit (CPU) can exhibit significant speedups compared to a CPU-only system.

The accelerators can process more data than they have ever had before, and the volume of such data is expected. However, the accelerators employ on-board memory whose size is relatively smaller compared to a host memory. The accelerators therefore use a non-volatile memory, for example a solid state disk (SSD), connected to a host machine to process large sets of data.

However, the accelerator and the non-volatile memory are completely disconnected from each other and are managed by different software stacks. Consequently, many redundant memory allocations/releases and data copies exist between a user-space and a kernel-space in order to read data from the non-volatile memory or write data to the non-volatile memory. Further, since a kernel module cannot directly access the user-space memory, memory management and data copy overheads between the kernel-space and the user-space are unavoidable. Furthermore, kernel-mode and user-mode switching overheads along with the data copies also contribute to long latency of data movements. These overheads causes the speedup improvement to be not significant compared to the accelerator performance.

There are many prior studies that integrate a specific application into SSDs as a form of active storage in order to address these problems. However, all these studies focus on storage devices such as the SSDs and leverage existing SSD controllers or employ customized field-programmable gate arrays (FPGAs) to process data within the SSDs. Therefore, only the specific applications that have been already integrated when the SSDs are manufactured can be executed but general-purpose computing applications cannot be executed near the SSD where data exist.

SUMMARY

An embodiment of the present invention provides a flash-based accelerator and a computing device for executing various applications.

According to an embodiment of the present invention, a flash-based accelerator performing data processing by supplementing functions of a CPU of a host or independently of the CPU is provided. The flash-based accelerator includes a flash-based non-volatile memory, a buffer subsystem, an accelerator controller, a plurality of processors, and a network. The flash-based non-volatile memory stores data in pages, and the buffer subsystem stores data in words or bytes. The accelerator controller manages data movement between the flash-based non-volatile memory and the buffer subsystem, and the plurality of processors process data stored in the buffer subsystem. The network integrates the flash-based non-volatile memory, the buffer subsystem, the accelerator controller, and the plurality of processors.

The accelerator controller may map a base address register of an interface connecting the flash-based accelerator and the host to the buffer subsystem or a processor among the plurality of processors, and receive a request from the host based on the base address register.

The accelerator controller may map the buffer subsystem to a first value of the base address register and move data from the host to the buffer subsystem based on the first value.

The accelerator controller may map a processor among the plurality of processors to a second value of the base address register and notify a type of the data from the host based on the second value.

The buffer subsystem may include a first memory including a first data space mapped to the flash-based non-volatile memory, and a second memory that stores a page table indicating mapping between pages of the flash-based non-volatile memory and the first data space.

The first memory may further include a second data space for downloading/uploading data from/to the host.

The data downloaded from the host may include an application to be executed by a processor among the plurality of processors.

A page table entry of the page table may include a page number of the first data space that is mapped to a physical flash page number of the flash-based non-volatile memory.

The page table entry may further include a processor identifier of an owner owning the page table entry.

The buffer subsystem may deny an access request of a requester requesting a memory access to the flash-based non-volatile memory when a processor identifier of the requester is different from the processor identifier of the owner.

The page table entry may further include a present bit flag that indicates whether requested data exist in the first data space or the flash-based non-volatile memory.

The second memory may further store a mapping table that maps a logical page number of the flash-based non-volatile memory achieved from a virtual address of the host to a physical flash page number of the flash-based non-volatile memory.

The second memory may further store a section header of a section including an application, and the section header may include section information indicating a range of an address space used by the section.

The buffer subsystem may deny an access request of the host when an address for the access request of the host is in a range of the address space of the section header.

According to another embodiment of the present invention, a computing device including the flash-based accelerator described above, the host, and an interface that connects the flash-based accelerator and the host is provided.

According to yet another embodiment of the present invention, a flash-based accelerator performing data processing by supplementing functions of a CPU of a host or independently of the CPU is provided. The flash-based accelerator includes a flash-based non-volatile memory, a buffer subsystem, a plurality of processors, and a network. The buffer subsystem includes a first memory including a first data space mapped to the flash-based non-volatile memory, and a controller that manages mapping between the flash-based non-volatile memory and the first data space. The plurality of processors process data stored on the buffer subsystem, and the network integrates the flash-based non-volatile memory, the buffer subsystem, and the plurality of processors.

The first memory may further include a second data space for storing an application from the host.

The application may be executed by a processor among the plurality of processors.

The buffer subsystem may further include a page table indicating mapping between pages of the flash-based non-volatile memory and the first data space.

A page table entry of the page table may include a page number of the first data space that is mapped to a physical flash page number of the flash-based non-volatile memory.

DETAILED DESCRIPTION OF THE EMBODIMENTS

Figure 1:
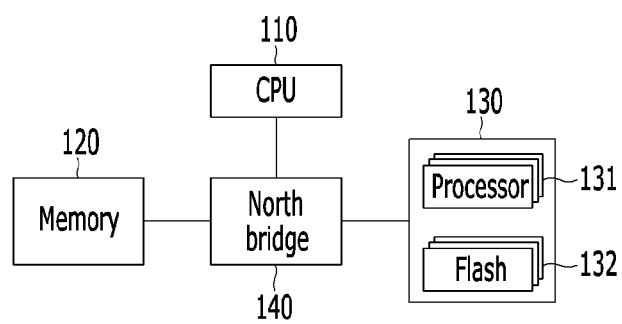
FIG. 1 is a schematic block diagram of a computing device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic block diagram of a computing device according to an embodiment of the present invention. FIG. 1 shows one example of the computing device, and the computing device according to an embodiment of the present invention may be implemented by use of various structures.

Referring to FIG. 1, a computing device according to an embodiment of the present invention includes a CPU 100, a CPU-side memory 200, and a flash-based accelerator 300. The accelerator 300 is a supplementary data processing device different from a general-purpose CPU, and may be computer hardware for performing data processing by supplementing functions of the CPU or performing the data processing independently of the CPU. A graphic processing unit (GPU) or many integrated core (MIC) device is one example of the accelerator 300.

The computing device may further include a northbridge 400 for connecting the memory 200 and the accelerator 300 with the CPU 100. The accelerator 300 may be connected to the northbridge 140 that locates at the CPU-side. For example, the accelerator 300 may be connected to the northbridge 140 via a PCIe (peripheral component interconnect express) link. The northbridge 140 may be also called a memory controller hub (MCH).

While a conventional accelerator includes only a plurality of processors for parallelism, the accelerator 300 according to an embodiment of the present invention is a flash-based accelerator, which physically integrates a plurality of processors 310 corresponding to accelerator cores with a flash-based non-volatile memory 320.

In some embodiment, each processor of the accelerator 300 may be a light-weight processor (LWP). In one embodiment, the LWPs may be low power processors that are connected over a high-speed network. In this case, the LWP can communicate with other internal resources such as an accelerator controller and the flash-based non-volatile memory through the high-speed network. Hereinafter, each processor of the accelerator 300 is described as the LWP for convenience.

In some embodiment, a system including the CPU 100 and the memory 200 may be called a host.

The computing device offloads various applications to the accelerator 300, which allows the accelerator 300 to directly execute the applications. For example, these applications may near data processing (NDP) applications that offload computations from the host to the accelerator 300. Hereinafter, an application is described as an NDP application for convenience application, and the NDP application may be called an NDP kernel. Accordingly, the host may access the accelerator 300 to either offload the NDP kernel or handle read/write of data. In this case, the LWP of the accelerator 300 can directly access the non-volatile memory with executing the NDP kernel. Therefore, many redundant memory allocations/releases and data copies that are required to read data from the non-volatile memory or write data to the non-volatile memory by the conventional accelerator can be removed.

Next, a flash-based accelerator according to an embodiment of the present invention is described with reference to FIG. 2 to FIG. 4.

Figure 2:
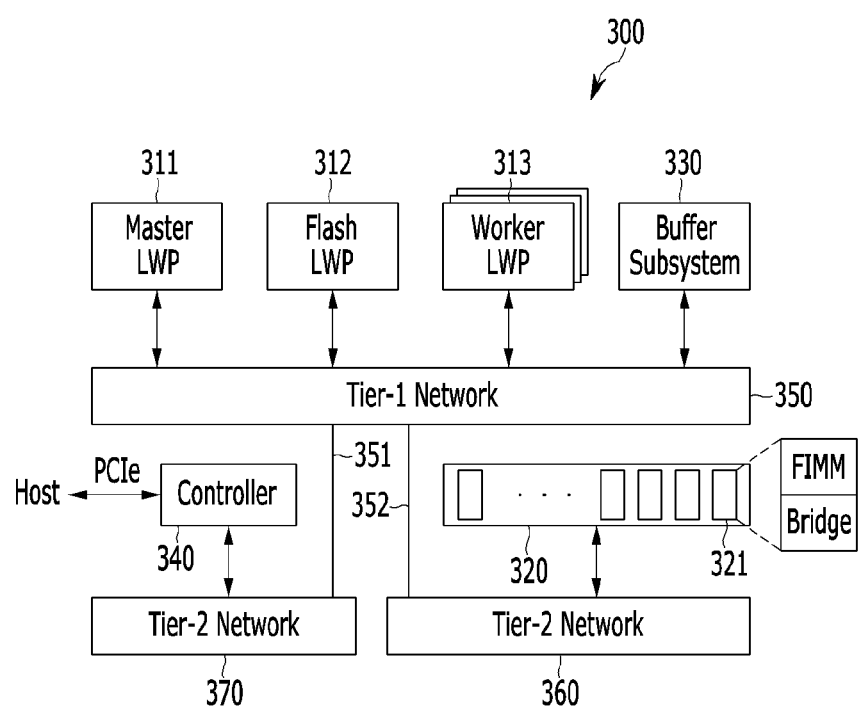
FIG. 2 is a schematic block diagram of a flash-based accelerator according to an embodiment of the present invention.
Figure 3:
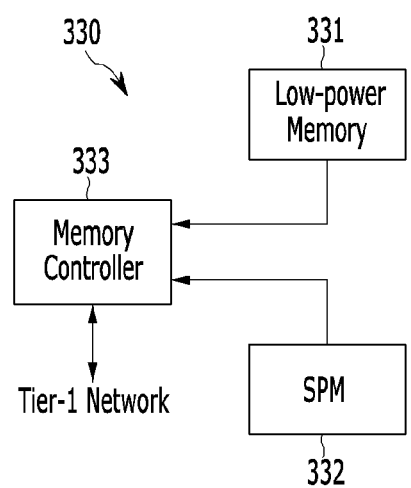
FIG. 3 is a schematic block diagram of a buffer subsystem in a flash-based accelerator shown in FIG. 2.
Figure 4:
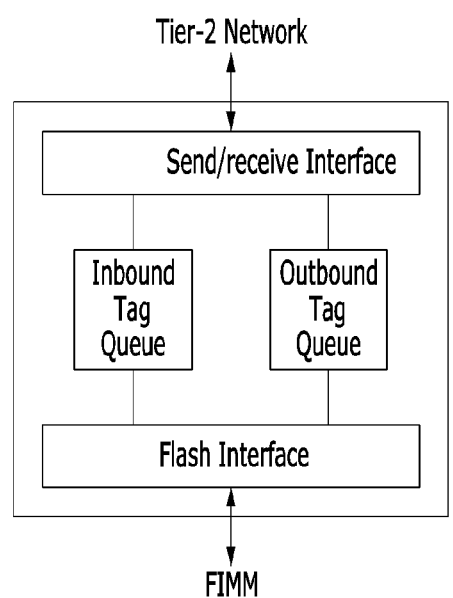
FIG. 4 is a schematic block diagram of an end bridge in a flash-based accelerator shown in FIG. 2.

FIG. 2 is a schematic block diagram of a flash-based accelerator according to an embodiment of the present invention, FIG. 3 is a schematic block diagram of a buffer subsystem in a flash-based accelerator shown in FIG. 2, and FIG. 4 is a schematic block diagram of an end bridge in a flash-based accelerator shown in FIG. 2.

Referring to FIG. 2, a flash-based accelerator 300 includes a plurality of LWPs 310, a flash-based non-volatile memory 320, a buffer subsystem (BS) 330, and an accelerator controller 340.

In some embodiments, the LWPs 310 may be built upon a very long instruction word (VLIW) architecture. The LWPs 310 may be all connected and share a single memory, i.e., the buffer subsystem 330, similar to a conventional symmetric multiprocessor architecture. In one embodiment, the LWP 310 may be classified into a master LWP 311, a flash LWP 312, and a worker LWP 313, based on tasks that each LWP 310 performs. The master LWP 311 may perform an administration work such as NDP kernel offloading and execution scheduling, the flash LWP 312 may perform a flash I/O (input/output) management, and the worker LWP 313 may perform an actual data processing near flash.

The flash-based non-volatile memory 320 may include a plurality of flash packages 321. The flash-based non-volatile memory 320 constructs an internal storage pool by integrating the flash package 321 to a network. Hereinafter, this flash-based non-volatile memory 320 is referred to as a flash backbone.

The buffer subsystem 330 may operate as a buffer memory between the flash backbone 320 for reading and writing data in pages and the host or LWP 310 for reading and writing data in words or bytes. The page may be, for example, 4 KB to 16 KB.

In some embodiments, the buffer subsystem 330 may include a first memory 331, a second memory 332, and a memory controller 333, as shown in FIG. 3.

In one embodiment, the first memory 331 may be a word- or byte-addressable memory. For example, a low-power memory such as a dynamic random access memory (DRAM) may be used as the first memory 331. The first memory may be used for a flash management and prefetching/buffering data. The second memory 332 may be a memory used for a fast processing. For example, a high-speed scratchpad memory (SPM) may be used as the second memory 332. The second memory may serve administrative I/O requests on a processor network as fast as L2 cache. Hereinafter, the first memory 331 and the second memory 332 are described as the low-power memory and a scratchpad memory (SPM) for convenience. The memory controller 333 may be provided as managements of the low-power memory 331 and the SPM 332.

The accelerator controller 340 manages data movements between the LWP 310 and flash backbone 320 in the accelerator 300 or data movements between the host and the flash backbone 320 of the accelerator 300, and manages conversion between page access and word or byte access. Upon receiving a data read request from the host or the LWP 310, the accelerator controller 340 reads corresponding data from the buffer subsystem 330 and transfers them to host or the LWP 310 if the data have been already stored in the buffer subsystem 330. If the corresponding data are not stored in the buffer subsystem 330, the accelerator controller 340 converts the data in the flash backbone 320 to data by word or byte and stores them in the buffer subsystem 330, and reads the data from the buffer subsystem 330 and transfers them to the host or the LWP 310. Upon receiving a data write request from the host or the LWP 310, the accelerator controller 340 writes corresponding data to the buffer subsystem 330, and converts the data written to the buffer subsystem 330 to data by page and transfers them to the flash backbone 320.

As such, according to an embodiment of the present invention, since the accelerator 300 maps data of the page-addressable flash backbone 320 to the buffer subsystem 330, the word- or byte-addressable host or LWP 310 can read data from the flash backbone 320 or write data to the flash backbone 320 without additional operation.

In some embodiments, when the accelerator 300 connects to the northbridge 400 via the PCIe interface, the accelerator controller 340 may be a PCIe controller.

Referring to FIG. 2 again, in some embodiments, the LWPs 310, the flash backbone 320, the buffer subsystem 330, and the accelerator controller 340 may connected to each other through networks 350, 360, and 370. The LWP 310 and the buffer subsystem 330 may be connected to the network 350, and the network 350 may be connected to the network 360 connected to the flash backbone 320 and the network 370 connected to the accelerator controller 340 via network switches 351 and 352.

In one embodiment, the network 350, 360, and 370 may be formed by separating a large network into two sets of crossbar configuration using a partial crossbar switch. The two sets may include a multiple simplified-crossbars (tier-2) and a streaming crossbar (tier-1). The network 350 integrating the LWPs 310 may be the tier-1 network, and the tier-1 network may be designed toward a high-speed network. The networks 360 and 370 may be the tier-2 networks. The throughput of the tier-2 network may be enough to accept the flash backbone 320 and PCIe communication.

In some embodiments, the flash package 321 of the flash backbone 320 may be formed by using a flash inline memory module (FIMM) defined in the inventor's treatise, "Triple-A: A Non-SSD Based Autonomic All-Flash Array for High Performance Storage Systems."

This treatise is incorporated herein by reference.

In the FIMM, a plurality of flash packages are integrated through a signal data channel. In some embodiments, the single data channel may share 16 I/O pins that can accommodate both a flash address and transaction command. As each flash package in practice has its own I/O control logic and a set of data registers, all the low-level transactions for flash may be handled from outside via ready/busy (R/B) and chip enable (CE) pins. Therefore, the FIMM not only defines easy-to-replace architecture but also provides a great potential to expose all flash internals to a host.

While the FIMM's standard defines its mechanical interface and signal groups, a clock frequency and the number of I/O pins of the FIMM defined in the above treatise may be different from those of a case that the FIMM is applied to the flash package according to an embodiment of the present invention. To fill this gap, an endpoint bridge for each FIMM may be added in some embodiment, as shown in FIG. 2 and FIG.

The endpoint bridge may convert I/O requests received by the flash backbone 320 into a clock domain for the FIMM. As shown in FIG. 4, the endpoint bridge includes a flash interface layer (FIL), a send/receive interface layer, an inbound tag queue, and an outbound tag queue. The flash interface layer takes charge of an interface with the flash packages, i.e., FIMMs, and the send/receive interface layer takes charge of send/receive through the network 370. The inbound and outbound tag queues are used for buffering I/O requests. During clock domain translation, the inbound and outbound tag queues can handle flash transactions and receive or transfer corresponding data from the network 370.

Next, a communication interface of an accelerator according to an embodiment of the present invention is described with reference to FIG. 5 and FIG. 6.

Figure 5:
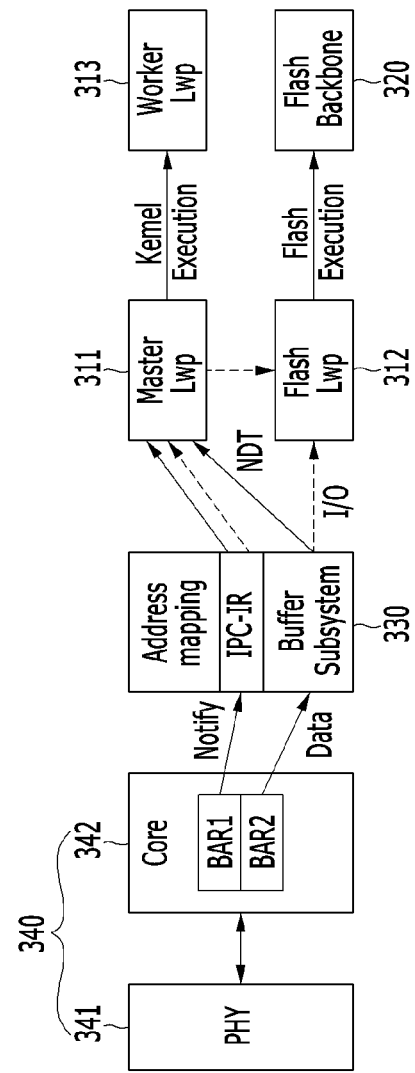
FIG. 5 shows a communication interface of an accelerator according to an embodiment of the present invention.
Figure 6:
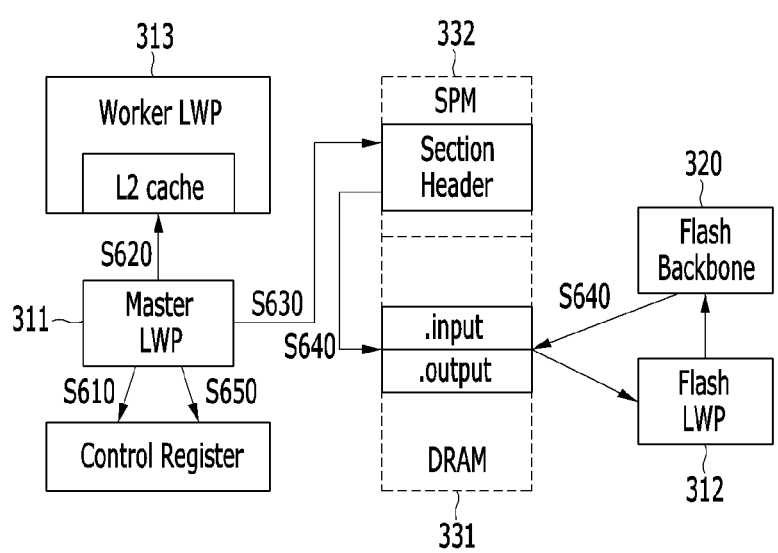
FIG. 6 shows an example of NDP kernel execution in a communication interface shown in FIG. 5.

FIG. 5 shows a communication interface of an accelerator according to an embodiment of the present invention, and FIG. 6 shows an example of NDP kernel execution in a communication interface shown in FIG. 5.

Referring to FIG. 5, an accelerator controller 340 receives a request from a host, and LWPs 310 of an accelerator 300 handle the request. The accelerator controller 340 includes a physical layer (PHY) 341 and a core 342.

A base address register (BAR) of an interface connecting the accelerator 300 and the host, for example a PCIe base address register, may be mapped to the core 342. In some embodiments, a buffer subsystem 330 may be mapped to the base address register having a value of BAR1, and an interprocess communication interrupt register (IPC-IR) of a master LWP 311 may be mapped to the base address register having a value of BAR2. The buffer subsystem 330, particularly a low-power memory 331 of the buffer subsystem 330, of the accelerator 300 and the IPC-IR of the master LWP 311 can be exposed to the host through the base address registers. The low-power memory 331 may deal with content migration of the accelerator 300, and the IPC-IR of the master LWP 311 may deal with computation control of the accelerator 300.

At the beginning of communication between the accelerator 300 and the host, the PHY 341 of the accelerator controller 340 passes an incoming request from the host to the core 342. The PHY 341 may handle interface timing requirements, for example PCIe timing requirements. The core 342 parses/marshals data from the host and forwards them to the buffer subsystem 330 or the IPC-IR of the master LWP 311 based the base address registers BAR1 and BAR2 indicated by the host.

The host migrates the data to the buffer subsystem 330 by indicating the base address register BAR1. Once the host is done with migrating the data to the buffer subsystem 330, the host may notify the completion of the migration to the master LWP 311 by indicating the base address register BAR2. In some embodiments, the host may notify the completion of the migration by updating the IPC-IR of the master LWP 311 with a different event identifier (ID). The event ID may be used for notifying a type of the event.

If the host offloads an NDP kernel, the master LWP 311 prepares NDP kernel execution and indicates the NDP kernel execution to a worker LWP 313. In this case, the event ID may indicate that the migrated data are an executable image of the NDP kernel.

If the host requests an I/O service, the master LWP 311 signals to a flash LWP 312 via a flash execution interface for the I/O service, and the flash LWP 312 executes data read/write on the flash backbone 320. In this case, the event ID may indicate that the migrated data are the I/O service. The I/O service may raise a coherence issue if there is a worker LWP 313 in processing data on the same place of the flash backbone 320 on which the data read/write is to be executed in accordance with the I/O service. To address this, in some embodiments, a memory permission control may be performed by the flash LWP 312 and the master LWP 311 together. The memory permission control will be described below.

In some embodiment, as shown in FIG. 5, the NDP kernel may be presented to the master LWP 311 by an NDP description table (NDT). In one embodiment, the NDP description table may be a similar form of executable and linkable format (ELP).

The NDP description table may include an executable including a predefined section like NDP-kernel code (for example, .text), and may further include a section header. The section header may include section information such as a corresponding section's name, start address and length. In some embodiments, the section header of the NDP description table may bring .input information defining an address space for an input array variable that the NDP kernel uses and .output information defining an address space for an output array variable that the NDP kernel uses, unlike the ELF.

As described with reference to FIG. 5, if the host offloads the NDP kernel to the buffer subsystem 330, the NDP kernel may be presented to the master LWP 311 by the NDP description table. Then, as shown in FIG. 6, the master LWP 311 first freezes a target worker LWP 313 through a control register (S610). The master LWP 311 then parses the NDP description table, loads a target NDP kernel (for example, .text) from the buffer subsystem 330, and assigns the loaded NDP kernel to an L2 cache of the worker LWP 313 (S620). Further, the master LWP 311 moves .input and .output information of a section header to the buffer subsystem 330, i.e., an SPM 332 of the buffer subsystem 330 (S630), and manages an appropriate address space of the flash backbone 320 (S640). Furthermore, a space corresponding to the address space is allocated to a low-power memory 331 of the buffer subsystem 330 based on the .input and .output information and is mapped to the address space of the flash backbone 320 (S640). Next, the master LWP 311 updates a start address of the NDP kernel (.text) via a boot address register of the worker LWP 313, resets the control register again, and launches the NDP kernel by triggering an IPC-IR of the target LWP 313 (S650). Accordingly, the NDP kernel can be offloaded to the accelerator 300 and be executed by the worker LWP 313. At the NDP kernel execution, the data read/write can be performed by using the address space of the flash backbone 320 and the space of the buffer subsystem 330 that are mapped.

In some embodiments, since the flash LWP 312 processes the I/O request, a queue subsystem (q-subsys) that implements a message buffer mechanism on the SPM 332 may be offered as a flash execution interface. The q-subsys may provide general queue interfaces such as create( ) open( ) alloc_msg( ), put( ) delete_msg( ), and delete( ) The create( ) creates a queue, the open( ) opens the queue, the alloc_msg( ) allocates a message, the put( ) sends the message, the delete_msg( ) deletes the message, and the delete( ) deletes the queue. In one embodiment, the q-subsys may be formed by two bi-directional I/O buffers with an arbitrator for the master LWP 311 and the buffer subsystem 330. Using this general queue application programming interface (API), the master LWP 311 and the buffer subsystem 330 can communicate with the flash LWP 312 without other interface protocol implementations.

As described above, according to an embodiment of the present invention, various NDP kernels can be offloaded to the accelerator 300 and be executed. At the NDP kernel execution, the accelerator 300 can read data from the flash backbone 320 or write data to the flash backbone 320 without additional data copies/movements with the host.

Next, in an accelerator 300 according to an embodiment of the present invention, address virtualization for mapping between a flash backbone 320 and a buffer subsystem 330 is described with reference to FIG. 7, FIG. 8, FIG. 9, and FIG. 10.

Figure 7:
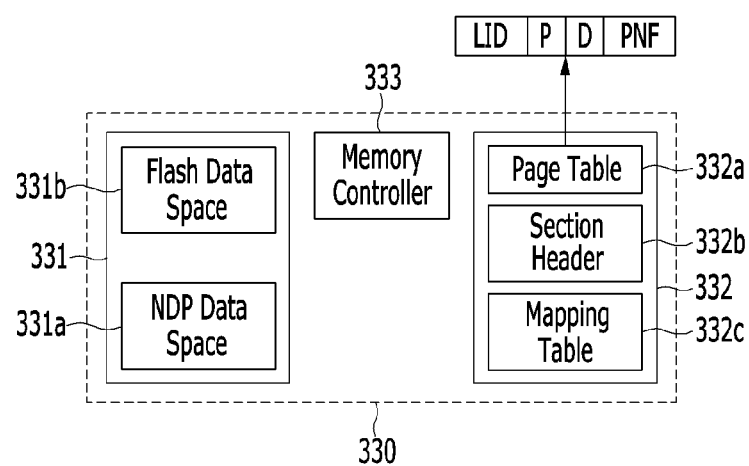
FIG. 7 shows a buffer subsystem for address virtualization in an accelerator according to an embodiment of the present invention.
Figure 8:
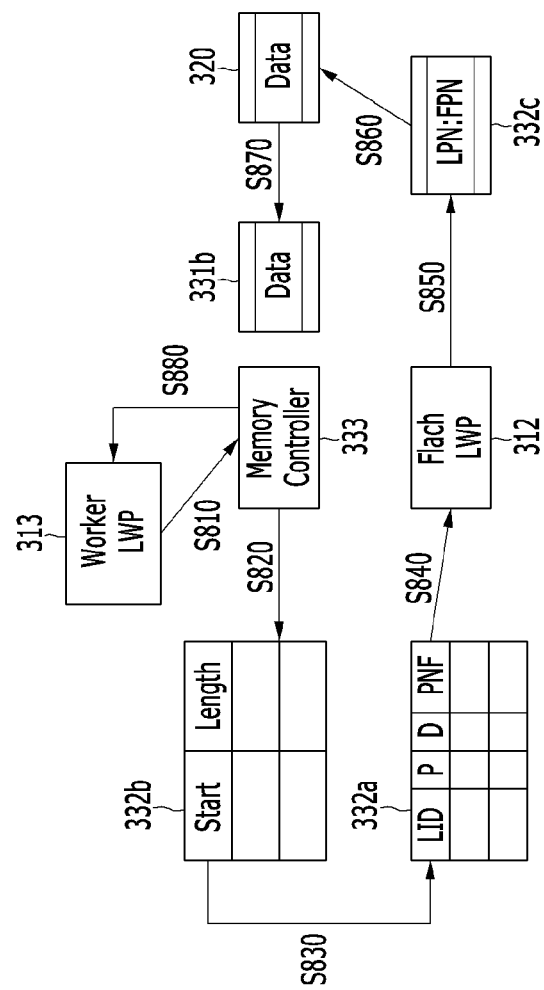
FIG. 8 is a drawing for explaining address virtualization in an accelerator according to an embodiment of the present invention.
Figure 9:
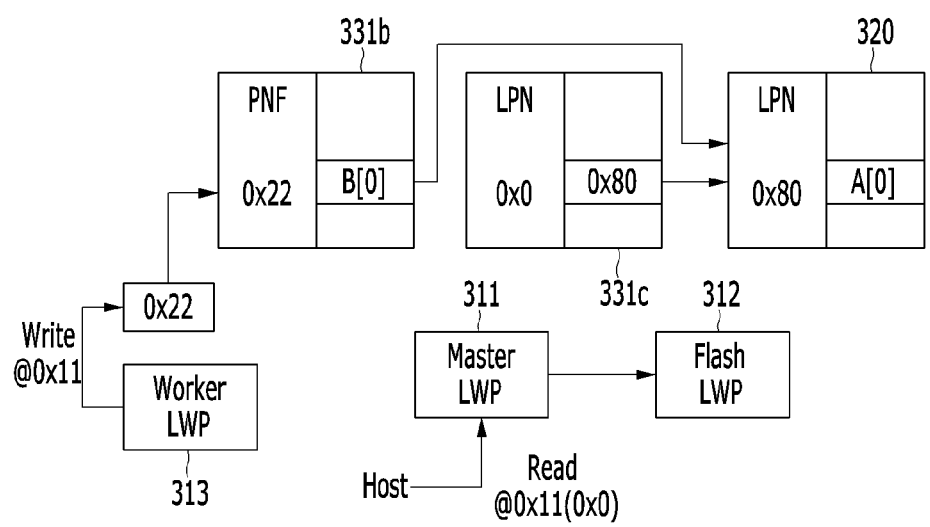
FIG. 9 and FIG. 10 are drawings for explaining data consistency in an accelerator according to an embodiment of the present invention.
Figure 10:
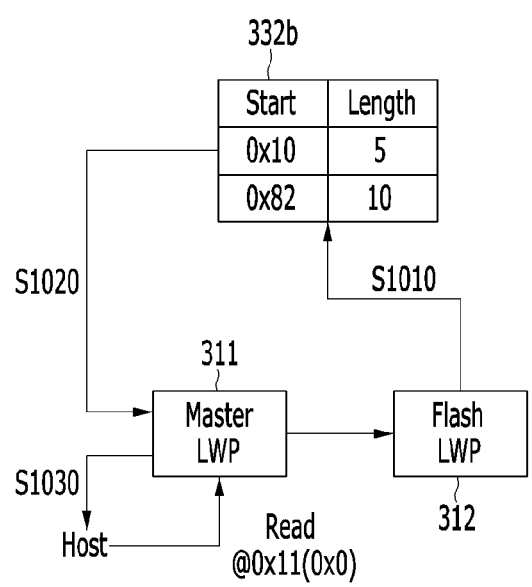

FIG. 7 shows a buffer subsystem for address virtualization in an accelerator according to an embodiment of the present invention, and FIG. 8 is a drawing for explaining address virtualization in an accelerator according to an embodiment of the present invention. FIG. 9 and FIG. 10 are drawings for explaining data consistency in an accelerator according to an embodiment of the present invention.

For flash address virtualization, a machine (for example, software) that makes a flash address space compatible with a traditional working memory space may be introduced. This machine may be implemented on a memory controller 333. Hereinafter, parts described as operations of the memory controller 333 may be executed by this machine.

Referring to FIG. 7, a low-power memory 331 of a buffer subsystem 330 may be partitioned into an NDP data space 331a and a flash data space 331b, and addresses may be mapped between the flash data space 331b and a flash backbone 320. The NDP data space 331a of the low-power memory 331 may be exposed to a host through a base address register (for example, BAR1 of FIG. 5), and map upload/download an executable of an NDP kernel or an I/O request to/from the host. To map two different address domains, an SPM 332 of the buffer subsystem 330 maintains a page table 332a which can map pages of the flash data space 331b and the flash backbone 320.

A page table entry (PTE) of the page table 332a managed by the SPM 332 may include a page number (PNF) of the flash data space 331b mapped to a physical flash page number (FPN) of the flash backbone 320, a present bit (P), an LWP ID (LID) of an owner owning the page table entry, and a dirty bit (D), and may be referred by a virtual address of an incoming memory request. The virtual address may be used for obtaining logical page number (LPN) which the memory controller 333 needs to send a message to a flash LWP 312.

The SPM 332 may further include a section header 332b and a mapping table 332c. The section header 332b includes section information such as a corresponding section's name, start address and length. The section corresponds to a predefined executable such as an NDP kernel code (for example, .text). The mapping table 332c is provided on a flash translation layer (FTL) and maps the virtual address (i.e., a logical address) used by the host to a physical address exposed by the flash. For this, the mapping table 332c provides mapping between logical page numbers and physical flash page numbers (FPNs).

The NDP data space 331a may be used by a master LWP 311, the mapping table 332c may be used by a flash LWP 312, and the flash data space 331b and the page table 332a may be used by a worker LWP 313.

Referring to FIG. 8, when a memory access requested by an NDP kernel execution is missed from an L1 cache of a worker LWP 313, the memory access goes directly to a memory controller 333 (S810). The memory controller 333 checks a section header 332b in an SPM 332 of a buffer subsystem 330 (S820). If a memory address for the memory access is within an address range (for example, an address range defined by a start address and a length of the section header 332b) defined by the section header 332b, the memory controller 333 inquiries a page table entry 332a indexed by the memory address (S830).

If an LID of the page table entry 332a is different from an LID of a requester requesting the memory access, the memory controller 333 protects the buffer subsystem 330 by declining the memory access request. Because the request of the requester that is irrelevant to an LWP owning the page table entry 332a of the SPM 332 is unauthorized access request, the memory controller 333 can protect the buffer subsystem 330 by declining the memory access request.

If the LID of the page table entry 332a is equal to the LID of the requester (that is, the request is an authorized access request), the memory controller 333 reviews a present bit (P) flag. If the present bit (P) flag is '0,' the memory controller 333 transfers a message requesting a read to a flash LWP 312 (S840). In some embodiments, a logical page number (LPN) which the memory controller 333 needs to send the message to the flash LWP 312 may be achieved by dividing the virtual address of the memory access request from the host with a size of a flash page.

The flash LWP 312 then translates the logical page number (LPN) to a physical flash page number (FPN) using a mapping table 332c (S850), and brings corresponding data to a page number of a flash data space 331b by reading the data from the physical flash page number (FPN) of the flash backbone 320 (S860). As the data exist in the flash data space 331b, the memory controller 333 updates the present bit (P) flag (S870) and serves the data to the L1 cache of the worker LWP 313 (S880).

If the present bit (P) flag is '1' when the memory controller 333 reviews the present bit (P) flag (S840), the corresponding data exist in the flash data space 331b. Therefore, the memory controller 333 can serve the data in the flash data space 331b to the L1 cache of the worker LWP 313 without bringing the data from the flash backbone 320.

If a plurality of worker LWPs 313 accesses on a same location of the flash as described above, consistency of the flash data space 331b can be maintained by comparing an LID of the page table entry 332a with LIDs of requesters. However, memory accesses in parallel requested by the host and the worker LWP 313 may hurt data consistency. Considering an example shown in FIG. 9 and FIG. 10, based on a host request that reads data at a virtual address 0x11, the flash LWP 312 translate a logical page number (LPN) 0x0 achieved from the virtual address 0x11 into a flash page number (FPN) 0x80 by looking up the mapping table 332c, and serves data A[ ] from the flash page number (FPN) 0x80 of the flash backbone 320. In this case, the worker LWP 313 may attempt to write data B[ ] located at a page number (PNF) 0x22 of the flash data space 331b to the virtual address 0x11. Then, the data A[ ] may be changed by the worker LWP 313. That is, the host and the worker LWP 313 may simultaneously access the data A[ ] to hurt the data consistency. To prevent this situation, in some embodiments, the flash LWP 312 reviews the section header 332b in the SPM 332 regarding the host request (S1010) as shown in FIG. 10.

If a target logical page number (LPN) achieved from the virtual address of the host request is in a range of an address space used by a certain NDP kernel, which is described by the section header 332b of the SPM 332, the accelerator 300 denies the access of the host request (S1020) and informs the permission denial to the host (S1030). For example, as exemplified in FIG. 9, the host may request to read data at the virtual address 0x11. In this case, since the virtual address 0x11 is in a range of an address space of a section where a start address is 0x10 and a length is 5, referring to the section header 332b, the accelerator 300 may deny the access of the host request. Accordingly, the data consistency of the flash backbone 320 can be maintained.

As such, when a plurality of LWPs 310 execute various NDP kernels, the flash backbone 320 can be compatible with the traditional working memory space by using the buffer subsystem 330. Further, because these functions can be executed by the machine implemented on the memory controller 333 of the buffer subsystem 330, the plurality of LWPs 310 and the flash backbone 320 can be physically incorporated without additional operation systems.

In some embodiments, unlike traditional accelerators using a single instruction multiple threads (SIMT) model, LWPs of an accelerator according to an embodiment of the present invention may execute different types of NDP kernels in parallel, each of which may include various operation functions. This enables users to offload diverse applications and perform different types of NDPs. Next, NDP kernel execution scheduling for performing the different types of NDPs is described.

According to an embodiment of the present invention, for the NDP kernel execution scheduling, inter-kernel execution scheduling and intra-kernel execution scheduling may be provided. In the inter-kernel execution scheduling, each worker LWP may execute a specific NDP kernel that performs data processing from the beginning to the end as a single instruction program. In the intra-kernel execution scheduling, an NDP kernel may be split into multiple code blocks and the multiple code blocks may be concurrently executed across multiple worker LWPs based on an input data layout.

First, inter-kernel execution scheduling in an accelerator according to an embodiment of the present invention is described with reference to FIG. 11, FIG. 12, and FIG. 13.

Figure 11:
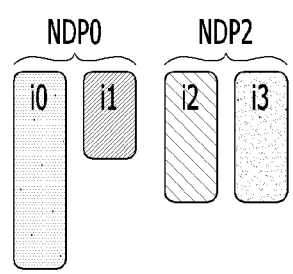
FIG. 11 shows an example of two NDP kernels.
Figure 12:
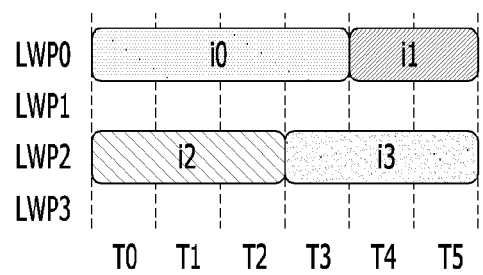
FIG. 12 shows an example of static inter-kernel scheduling.
Figure 13:
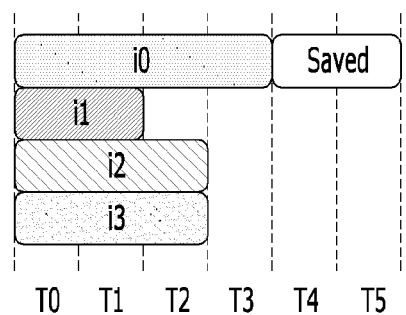
FIG. 13 shows an example of dynamic inter-kernel scheduling.

FIG. 11 shows an example of two NDP kernels, FIG. 12 shows an example of static inter-kernel scheduling, and FIG. 13 shows an example of dynamic inter-kernel scheduling.

Inter-kernel execution scheduling may be classified into static inter-kernel scheduling and dynamic inter-kernel scheduling.

Referring to an example shown in FIG. 11, two NDP kernels NDP0 and NDP2 are provided, two NDP instances i0 and i1 are associated with the NDP kernel NDP0, and two NDP instances i2 and i3 are associated with the NDP kernel NDP2.

In static inter-kernel scheduling according to one embodiment, incoming NDP requests received from the host is statically allocated to a specific NDP based on its execution type. For example, referring to FIG. 12, in the static inter-kernel scheduling, the instances i0 and i1 of the NDP kernel NDP0 may be statically allocated to a worker LWP LWP0, and the instances i2 and i3 of the NDP kernel NDP1 may be statically allocated to a worker LWP LWP2.

The static inter-kernel scheduling is easy to implement and manage heterogeneous NDP kernels. However, the static inter-kernel scheduling may introduce poor resource utilization in a case that an execution time for each NDP kernel is not well balanced.

In dynamic inter-kernel scheduling according to another embodiment, to the poor resource utilization issue behind the static scheduling, a master LWP may dynamically allocate an NDP request to any worker LWP in a worker LWP pool based on its service availability. For example, at the beginning of scheduling, the master LWP may distribute different types of NDP kernels to all the worker LWPs in a round robin fashion. After that, whenever the worker LWP signals to the master LWP through an IPC-IR by completing an instance execution, the master LWP may allocate a next available NDP kernel instance to the worker LWP back-to-back. For example, as shown in FIG. 12, the master LWP may sequentially allocate the instances i0, i1, i2, and i3 of the two NDP kernels NDPO and NDP2 to four worker LWPs LWP0, LWP1, LWP2, and LWP3. Then, since the instances i1 and i3 can be served with the instances i0 and i2 in parallel, the resource utilization can be improved and time slots can be saved.

Next, intra-kernel execution scheduling in an accelerator according to an embodiment of the present invention is described with reference to FIG. 14, FIG. 15, and FIG. 16.

Figure 14:
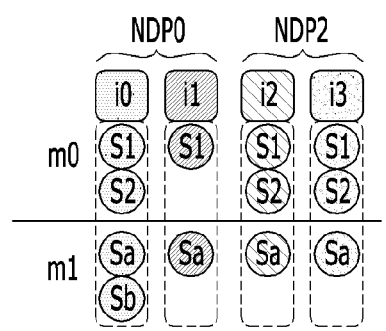
FIG. 14 shows another example of two NDP kernels.
Figure 15:
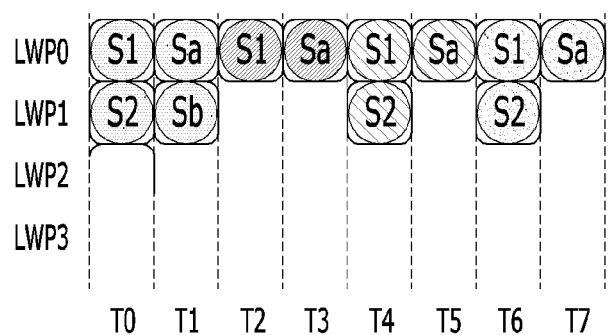
FIG. 15 shows an example of in-order intra-kernel scheduling.
Figure 16:
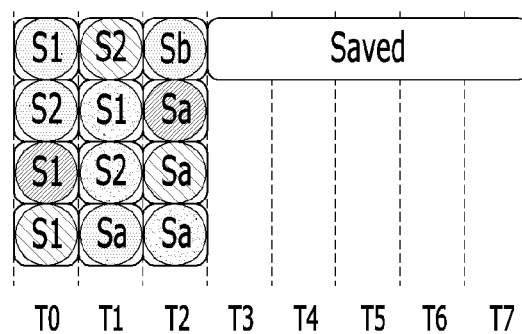
FIG. 16 shows an example of out-of-order intra-kernel scheduling.

FIG. 14 shows another example of two NDP kernels, FIG. 15 shows an example of in-order intra-kernel scheduling, and FIG. 16 shows an example of out-of-order intra-kernel scheduling.

Intra-kernel execution scheduling may be classified into in-order intra-kernel scheduling and out-of-order intra-kernel scheduling.

An NDP kernel in practice may be formed by multiple groups of code segments, referred to as microblocks. Each group has execution dependence on its input/output data. The microblock is executed in a certain order, but there are operations, called screens, which can work in parallel on different parts of I/O matrices, within the microblock. Referring to an example shown in FIG. 14, two NDP kernels NDPO and NDP2 are provided, two NDP instances i0 and i1 are associated with the NDP kernel NDP0, and two NDP instances i2 and i3 are associated with the NDP kernel NDP2. Each instance includes two microblocks m0 and m1. In this case, the microblock m0 of the instance i0 includes two screens S1 and S2, the microblock m1 of the instance i0 includes two screens Sa and Sb. The microblock m0 of the instance i1 includes one screen S1, and the microblock m1 of the instance i1 includes two screens Sa and Sb. The microblock m0 of the instance i2 includes two screens S1 and S2, and the microblock m1 of the instance i2 includes one screen Sa. The microblock m0 of the instance i3 includes two screens S1 and S2, and the microblock m1 of the instance i3 includes one screen Sa.

In in-order intra-kernel scheduling according to one embodiment, each microblock of each instance may be sequentially executed, and all the screens included in each microblock of each instances may be simultaneously executed by different LWPs. For example, as shown in FIG. 15, after the screens S1 and S2 of the microblock m0 in the instance i0 is executed at a time T0, the screens Sa and Sb of microblock m1 in the instance i0 may be executed at a time T1. After that, the screen S1 of the microblock m0 in the instance i1 may be executed in a time T2, and then the screen Sa of the microblock m1 in the instance it may be executed in a time T3. Subsequently, after the screens S1 and S2 of the microblock m0 in the instance i2 is executed at a time T4, the screen Sa of microblock m1 in the instance i2 may be executed at a time T5. After that, the screens S1 and S2 of the microblock m0 in the instance i3 may be executed in a time T6, and then the screen Sa of the microblock m1 in the instance i3 may be executed in a time T7. The two screens S1 and S2 of the microblock m0 in the instance i0 can be simultaneously executed by the different LWPs LWP0 and LWP1. Similarly, a plurality of screens of the same microblock in the same instance can be simultaneously executed by the different LWPs.

As such, since the plurality of screens are simultaneously executed, the execution time can be reduced compared with the inter-kernel execution scheduling where the screens of one instance are sequentially executed.

In out-of-order intra-kernel scheduling according to another embodiment, many screens associated with different instances as well as different microblocks may be executed in an out-of-order fashion, unlike the in-order intra-kernel scheduling. If there are any idle LWPs at a certain time, the out-of-order intra-kernel scheduling may borrow some screens from a different microblock which exists across a different instance boundary or a different NDP kernel boundary. Accordingly, the execution time of the microblocks can be reduced and overall system performance can be enhanced.

Because the two LWPs LWP2 and LWP3 are idle at the time T0 as shown in FIG. 15, screens of the different microblocks can be filled at the time T0. For example, the screens S1 and S2 of the microblock m0 in the instance i0, the screen S1 of the microblock m0 in the instance i1, and the screen S1 of the microblock m0 in the instance i2 can be simultaneously executed by the different LWPs LWP0, LWP1, LWP2, and LWP3 at the time T0. Further, the screen S2 of the microblock m0 in the instance i2, the screens S1 and S2 of the microblock m0 in the instance i3, and the screen Sa of the microblock m1 in the instance i0 can be simultaneously executed by the different LWPs LWP0, LWP1, LWP2, and LWP3 at the time T1. Furthermore, the screen Sb of the microblock m1 in the instance i0, the screen Sa of the microblock m1 in the instance i1, the screen Sa of the microblock m1 in the instance i2, and the screen Sa of the microblock m1 in the instance i3 can be simultaneously executed by the different LWPs LWP0, LWP1, LWP2, and LWP3 at the time T2.

Next, results measured after implementing an accelerator 300 according to an embodiment of the present invention on a real hardware are described.

As expressed in the below Table 1, eight LWPs operating at 1 GHz clock, each having its own 64 KB L1 cache and 512 KB L2 cache are used at performance measurement. Among the eight LWPs, six LWPs are used as worker LWPs and two LWPs are used as a master LWP and a flash LWP. In a buffer subsystem, 4 MB SRAM-based SPM is used as an SPM and 2 GB DDR3L DRAM is used as a low-power memory. Further, 32 flash dies are used as a flash-based non-volatile memory.

TABLE 1

| Components | Specification | Working frequency | Port width | Estimated bandwidth |
| --- | --- | --- | --- | --- |
| LWP | 8 processors | 1 GHz | 128 b | 16000 MB/s |
| L1/L2 cache | 64 KB/512 KB | 500 MHz | 256 b | 16000 MB/s |
| SPM | shared, 4 MB | 500 MHz | 256 b | 16000 MB/s |
| DRAM | DDR3L, 2 GB | 800 MHz | 64 b | 6400 MB/s |
| Flash | 32 dies | 200 MHz | 64 b | 3200 MB/s |
| PCIe | v2.0, 2 lanes | 5 GHz | 2 b | 1024 MB/s |
| Tier-1 crossbar | 256 lanes | 500 MHz | 256 b | 16000 MB/s |
| Tier-2 crossbar | 128 lanes | 333 MHz | 128 b | 5328 MB/s |

In this case, the accelerator according to an embodiment of the present invention can improve performance by 7.8× and 75%, while reducing energy consumption by 88% and 57%, compared to CPU-driven data processing and GPU-based data processing approaches.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A flash-based accelerator that performs data processing by supplementing functions of a central processing unit (CPU) of a host or independently of the CPU and is configured to be connected to the host, the flash-based accelerator comprising:
a flash-based non-volatile memory that stores data in pages;
a buffer subsystem including a first memory that stores data and is mapped to the flash-based non-volatile memory, and a second memory that stores a table indicating mapping between the flash-based non-volatile memory and the first memory, a kernel being offloaded to the first memory of the buffer subsystem from the host;
an accelerator controller that manages data movement between the flash-based non-volatile memory and the buffer subsystem;
a plurality of processors that process data stored in the buffer subsystem so as to be integrated with the flash-based non-volatile memory; and
a network that physically integrates the flash-based non-volatile memory, the buffer subsystem, the accelerator controller, and the plurality of processors,
wherein in accordance with a memory access requested by execution of the kernel by at least one of the processors, data move between an area of the first memory and an area of the flash-based non-volatile memory which are designated based on a memory address of the memory access and a table entry of the table referred by the memory address.

2. The flash-based accelerator of claim 1, wherein the accelerator controller maps a base address register of an interface connecting the flash-based accelerator and the host to the buffer subsystem or a processor among the plurality of processors, and receives a request from the host based on the base address register.

3. The flash-based accelerator of claim 2, wherein the accelerator controller maps the buffer subsystem to a first value of the base address register, and moves data from the host to the buffer subsystem based on the first value.

4. The flash-based accelerator of claim 3, wherein the accelerator controller maps a processor among the plurality of processors to a second value of the base address register, and notifies a type of the data from the host based on the second value.

5. The flash-based accelerator of claim 1, wherein the first memory includes a first data space mapped to the flash-based non-volatile memory.

6. The flash-based accelerator of claim 5, wherein the first memory further includes a second data space to which the kernel is offloaded from the host.

7. The flash-based accelerator of claim 1, wherein the table entry of the table includes a page number of the first memory that is mapped to a physical flash page number of the flash-based non-volatile memory.

8. The flash-based accelerator of claim 7, wherein the table entry further includes a processor identifier of an owner owning the table entry.

9. The flash-based accelerator of claim 8, wherein the buffer subsystem denies an access request of a requester requesting the memory access to the flash-based non-volatile memory when a processor identifier of the requester is different from the processor identifier of the owner.

10. The flash-based accelerator of claim 7, wherein the table entry further includes a present bit flag that indicates whether requested data exist in the first memory or the flash-based non-volatile memory.

11. The flash-based accelerator of claim 7, wherein the second memory further stores a mapping table that maps a logical page number of the flash-based non-volatile memory achieved from memory address to a physical flash page number of the flash-based non-volatile memory.

12. The flash-based accelerator of claim 7, wherein the second memory further stores a section header of a section including an application, and wherein the section header includes section information indicating a range of an address space used by the section.

13. The flash-based accelerator of claim 12, wherein the buffer subsystem denies an access request of the host when an address for the access request of the host is in a range of the address space of the section header.

14. A computing device comprising:
the flash-based accelerator of claim 1;
the host; and
an interface that connects the flash-based accelerator and the host.

15. The flash-based accelerator of claim 1, wherein the plurality of processors that process the data stored on the buffer subsystem so as to be integrated with the flash-based non-volatile memory without assistance of an operating system.

16. A flash-based accelerator that performs data processing by supplementing functions of a central processing unit (CPU) of a host or independently of the CPU and is configured to be connected to the host, the flash-based accelerator comprising:
a flash-based non-volatile memory;
a buffer subsystem including
a first memory mapped to the flash-based non-volatile memory, a kernel being offloaded to the first memory from the host,
a second memory that stores a table indicating mapping between the flash-based non-volatile memory and the first memory, and
a controller that manages mapping between the flash-based non-volatile memory and the first memory;
a plurality of processors that process data stored on the buffer subsystem so as to be integrated with the flash-based non-volatile memory; and
a network that physically integrates the flash-based non-volatile memory, the buffer subsystem, and the plurality of processors,
wherein in accordance with a memory access requested by execution of the kernel by at least one of the processors, data move between an area of the first memory and an area of the flash-based non-volatile memory which are designated based on a memory address of the memory access and a table entry of the table referred by the memory address.

17. The flash-based accelerator of claim 16, wherein the first memory includes a first data space which is mapped to the flash-based non-volatile memory and a second data space to which the kernel is offloaded from the host.

18. The flash-based accelerator of claim 16, wherein the table indicates mapping between pages of the flash-based non-volatile memory and the first data space.

19. The flash-based accelerator of claim 16, wherein the table entry of the table includes a page number of the first memory that is mapped to a physical flash page number of the flash-based non-volatile memory.

20. The flash-based accelerator of claim 16, wherein the plurality of processors that process the data stored in the buffer subsystem so as to be integrated with the flash-based non-volatile memory without assistance of an operating system.

* * * * *